United States Patent
Duan et al.

(10) Patent No.: US 7,578,030 B2
(45) Date of Patent: Aug. 25, 2009

(54) HINGE MECHANISM FOR FOLDABLE ELECTRONIC DEVICE

(75) Inventors: Chao Duan, Shenzhen (CN); Chia-Hua Chen, Tu-Cheng (TW)

(73) Assignees: Shenzhen Futaihong Precision Industry Co., Ltd., ShenZhen, Guangdong Province (CN); Sutech Trading Limited, Tortola (VG)

( * ) Notice: Subject to any disclaimer, the term of this patent is extended or adjusted under 35 U.S.C. 154(b) by 443 days.

(21) Appl. No.: 11/391,873

(22) Filed: Mar. 28, 2006

(65) Prior Publication Data
US 2006/0265838 A1    Nov. 30, 2006

(30) Foreign Application Priority Data
May 28, 2005  (CN) .................. 2005 1 0034958

(51) Int. Cl.
*E05D 11/10* (2006.01)
(52) U.S. Cl. .................. 16/330; 16/273; 16/303
(58) Field of Classification Search .......... 16/303, 16/330, 275, 276, 273; 379/433.13, 433.12; 361/680–683; 455/90.3, 90.1, 550.1, 575.1, 455/575.3
See application file for complete search history.

(56) References Cited

U.S. PATENT DOCUMENTS

| | | | | |
|---|---|---|---|---|
| 3,499,183 A | * | 3/1970 | Parsons ................... | 16/273 |
| 3,874,028 A | * | 4/1975 | Ernst et al. ............... | 16/276 |
| 3,955,241 A | * | 5/1976 | Little .................... | 16/298 |
| 4,359,804 A | * | 11/1982 | McNinch ................. | 16/276 |
| 5,682,644 A | * | 11/1997 | Bohacik et al. ........... | 16/284 |
| 5,937,482 A | * | 8/1999 | Horng .................... | 16/340 |
| 6,065,187 A | * | 5/2000 | Mischenko ............... | 16/341 |
| 6,920,668 B2 | * | 7/2005 | Hayashi .................. | 16/303 |
| 6,950,686 B2 | * | 9/2005 | Won ...................... | 455/575.3 |
| 7,100,244 B2 | * | 9/2006 | Qin et al. ................ | 16/330 |

FOREIGN PATENT DOCUMENTS

| | | |
|---|---|---|
| CN | 03236411.3 | 5/2004 |
| CN | 1161944 C  | 8/2004 |

* cited by examiner

*Primary Examiner*—Chuck Y. Mah
(74) *Attorney, Agent, or Firm*—Zhigang Ma

(57) ABSTRACT

A hinge mechanism includes a shaft (1), a cam follower (12), a cam (2), an antifriction member (3), a washer (4) and an elastic member (5). The cam follower is fixed relative to the shaft and has a cam follower surface. The cam has a cam surface (24) and a cam hole defined therein. The cam is rotatable relative to the cam follower. The shaft runs through the cam, the washer and the elastic member, in turn. The antifriction member has one end touching the cam and an opposite end touching the washer. The cam surface abuts against the cam follower surface due to the elastic force of the elastic member. As the friction coefficient between the antifriction member and washer is smaller than that between the cam and the washer, the hinge mechanism generates a smaller friction therebetween, so the waste of energy is very small.

16 Claims, 6 Drawing Sheets

HINGE MECHANISM FOR FOLDABLE ELECTRONIC DEVICE

BACKGROUND OF THE INVENTION

1. Field of the Invention

The present invention generally relates to hinge mechanisms and, more particularly, to a hinge mechanism for hinging together housings of a foldable, portable electronic device such as a mobile phone or a PDA (Personal Digital Assistant).

2. Discussion of the Related Art

Portable mobile phones generally have two housings rotatably joined by a type of hinge that allows the housings to fold upon one another. Many such foldable mobile phones have most of the electronics in one housing, called the main housing, and fewer electronics in the other housing, called the cover. Other such foldable mobile phones have all the electronics in the main housing, with the cover serving only to cover a keypad and a display of the main housing. The main housing and the cover are connected together by a hinge mechanism. Generally, the opening or closing of most covers is achieved by means of a cam mechanism and a spring in the hinge mechanism.

A typical hinge mechanism for foldable mobile phones comprises a shaft, an elastic member, a cam and a cam follower. The cam and the cam follower each have a cam surface attached to the other. The cam, the cam follower and the elastic member surround the shaft. The elastic member directly abuts against the cam. The cam follower matches (i.e. mates and operatively connects) with a main housing of the portable mobile phone. In a similar fashion, the cam matches with a cover. When opening the cover, the cam rotates together with the cover and relative to the elastic member and the cam follower. Therefore, a large friction is produced between the cam and the elastic member.

It can be seen that, a lot of energy is wasted, via friction, in the above-described hinge mechanism. In addition, it is difficult to open the cover smoothly because of the substantial degree of friction. Furthermore, the friction will result in abrasion, which shortens the lifetime of the hinge mechanism and eventually makes the hinge mechanism perform in an unstable manner.

What is needed, therefore, is a hinge mechanism which generates a relatively low amount of friction.

SUMMARY OF THE INVENTION

A hinge mechanism includes a shaft, a cam follower, a cam, an antifriction member, a washer, and an elastic member. The cam follower is fixed relative to the shaft and has a cam follower surface. The cam has a cam surface and a cam hole defined therein. The cam is rotatable relative to the cam follower. The shaft runs through the cam, the washer and the elastic member, in turn. The antifriction member has one end touching the cam and an opposite end touching the washer. The cam surface abuts against the cam follower surface due to the elastic force of the elastic member. As the friction coefficient between the antifriction member and washer is smaller than that between the cam and the washer, the hinge mechanism generates a smaller friction therebetween, so the waste of energy is very small.

An electronic device includes a main housing, a cover, and an above-described hinge mechanism configured for rotatably hinging the main housing and the cover. The shaft has a stop portion engaging with one of the main housing and the cover, and the cam has a rib engaging with the other of the main housing and the cover.

Other advantages and novel features of preferred embodiments of the present hinge system and its applications will become more apparent from the following detailed description when taken in conjunction with the accompanying drawings.

BRIEF DESCRIPTION OF THE DRAWINGS

Many aspects of the present hinge mechanisms and their applications can be better understood with reference to the following drawings. The components in the drawings are not necessarily to scale, the emphasis instead being placed upon clearly illustrating the principles of the hinge mechanisms. Moreover, in the drawings, like reference numerals designate corresponding parts throughout the several views.

DETAILED DESCRIPTION OF PREFERRED EMBODIMENTS

Figure 1:
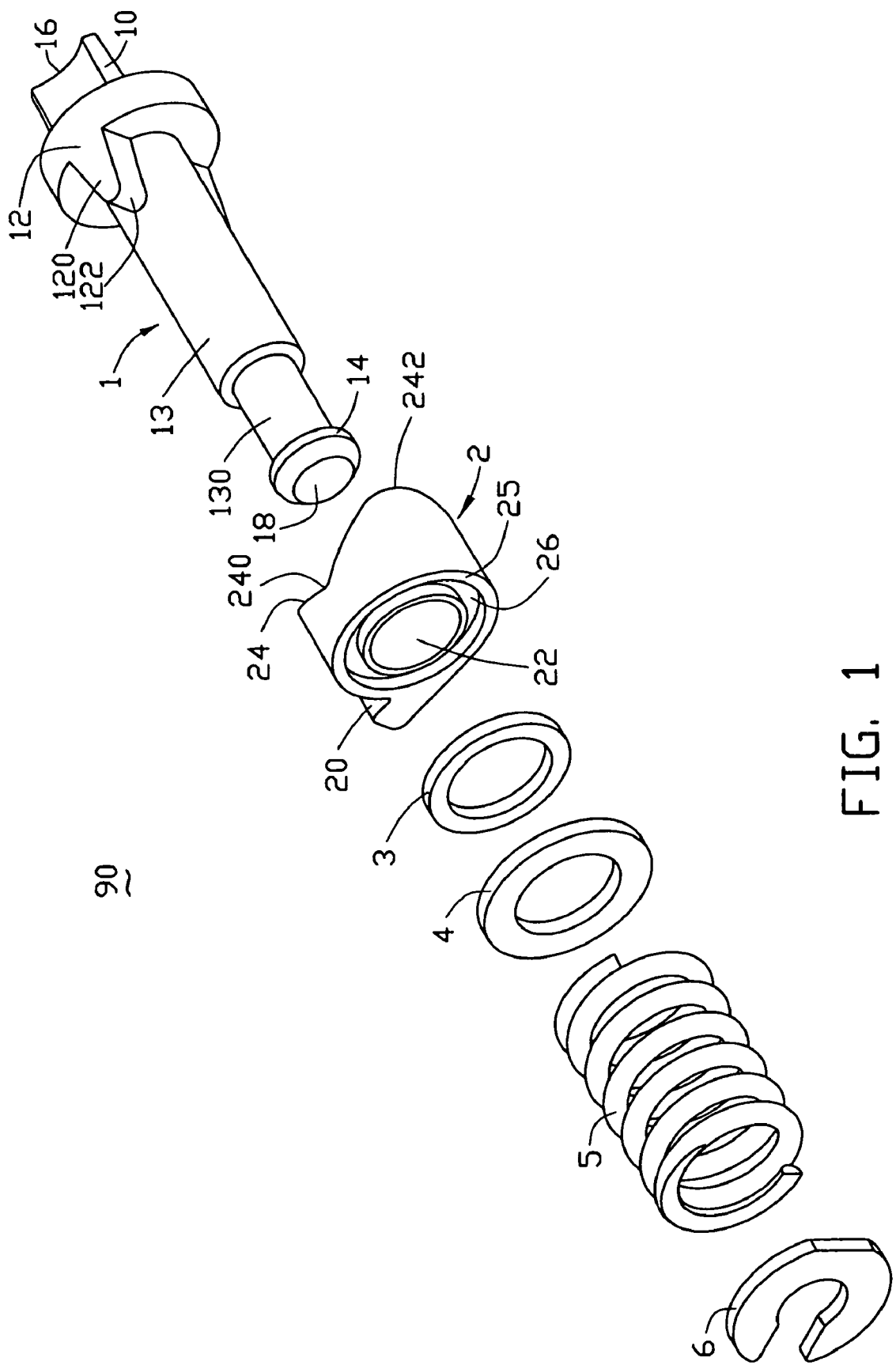
FIG. 1 is an exploded, isometric view of a hinge mechanism in accordance with a preferred embodiment of the present hinge mechanism.
Figure 2:
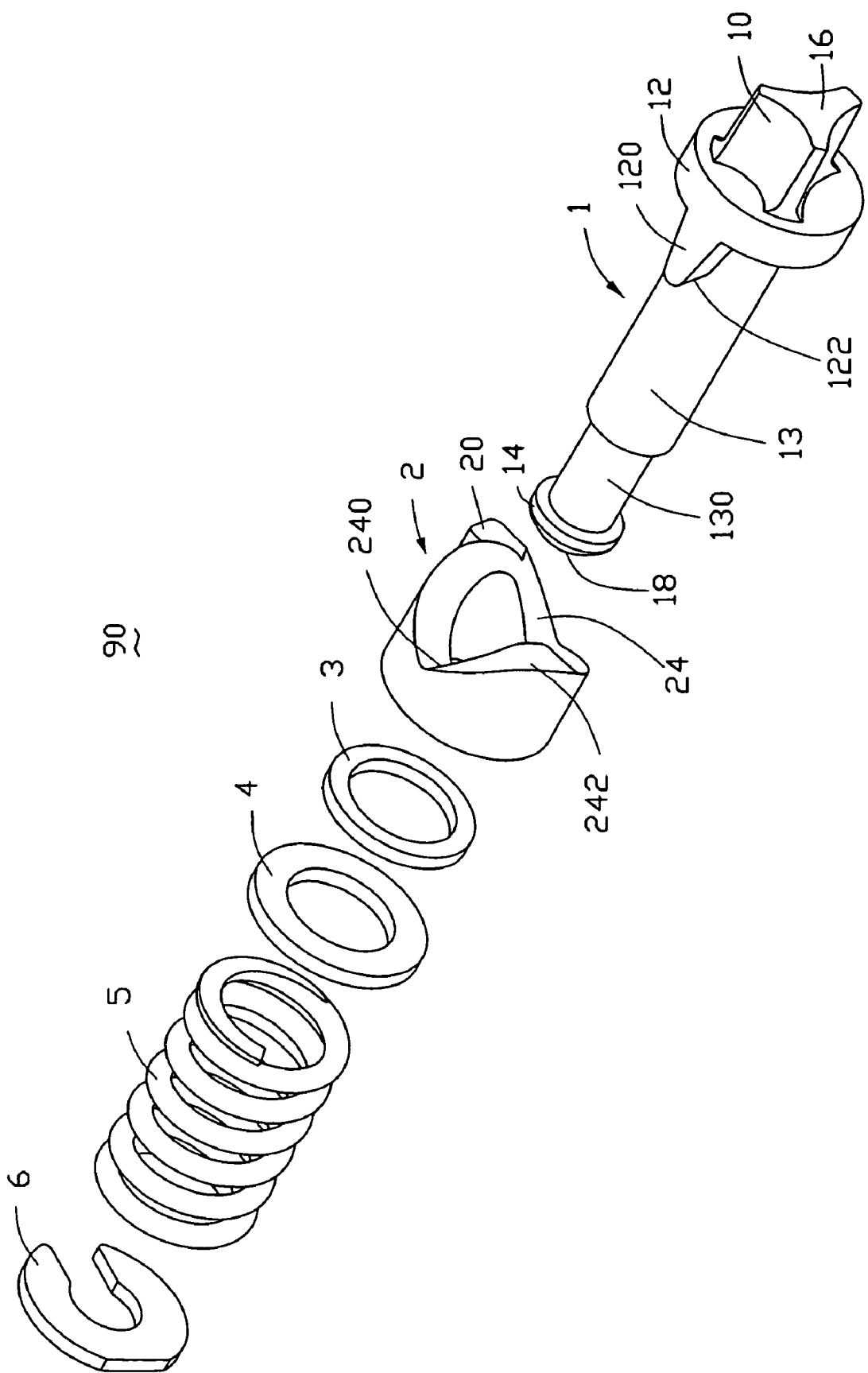
FIG. 2 is similar to FIG. 1, but viewing from another direction.

Referring to FIG. 1 and FIG. 2, a hinge mechanism 90 includes a shaft 1, a cam 2, an antifriction member 3, a washer 4, a spring 5, and a ring 6. The cam 2, the washer 4, the spring 5 and the ring 6 are mounted on the shaft 1 in turn.

The shaft 1 includes a stop portion 10, a rotating portion 12 (i.e., cam follower), a shaft portion 13, and a flange 14, arranged in turn. The shaft 1 has a first shaft end 16 and an opposite second shaft end 18. The stop portion 10 is formed at the first shaft end 16, and the flange 14 is formed at the second shaft end 18. Two extensions 120, each with a tip 122 on the top (i.e. distal portion) thereof, extend axially and symmetrically from the rotating portion 12. With a diameter smaller than that of rest portion of the shaft portion 13 and the flange 14, a small shaft 130 is disposed adjacent to the flange 14 on the shaft portion 13.

The cam 2 is column-shaped with a through hole 22 running though and along a center axis thereof. A rib 20 is formed on the outside wall of the cam 2. A cam surface 24 is formed on one end of the cam 2. The cam surface 24 includes a pair of valleys 240 and a pair of peaks 242 which are symmetrical in shape. The cam 2 further includes a joining end 25 opposite to the cam surface 24. A ring-shaped slot 26 is defined at the joining end 25 in the cam 2.

The antifriction member 3 and the washer 4 are ring-shaped. The antifriction member 3 is made of materials with small friction coefficient such as nylon or polyformaldehyde. A friction coefficient between the antifriction member 3 and the washer 4 is smaller than that between the cam 2 and the washer 4. The washer 4 can be either received or not received in the slot 26 of the cam 2. When the washer 4 has a size appropriate for receiving in the slot 26 of the cam 2, the thickness of the antifriction member 3 is either larger, smaller than or equal to the depth of the slot 26 of the cam 2. When the washer 4 has a size can not be received in the slot 26 of the cam 2, the thickness of the antifriction member 3 is either larger than or equal to the depth of the slot 26 of the cam 2. The antifriction member 3 either fully or partly touches the washer 4.

The spring 5 is helical in configuration, occupies a cylinder-shaped volume, and is placed around the shaft 1. The cam surface 24 of the cam 2 always resists the extensions 120 of the rotating portion 12 due to the elastic nature (i.e. generating a spring force when compressed/extended) of the spring 5. The ring 5 is C-shaped. The ring 5 surrounds the small shaft 130 and adjacent to the flange 14 of the shaft 1 thus preventing the cam 2, the washer 4 and the spring 5 from falling off the shaft portion 13.

Figure 3:
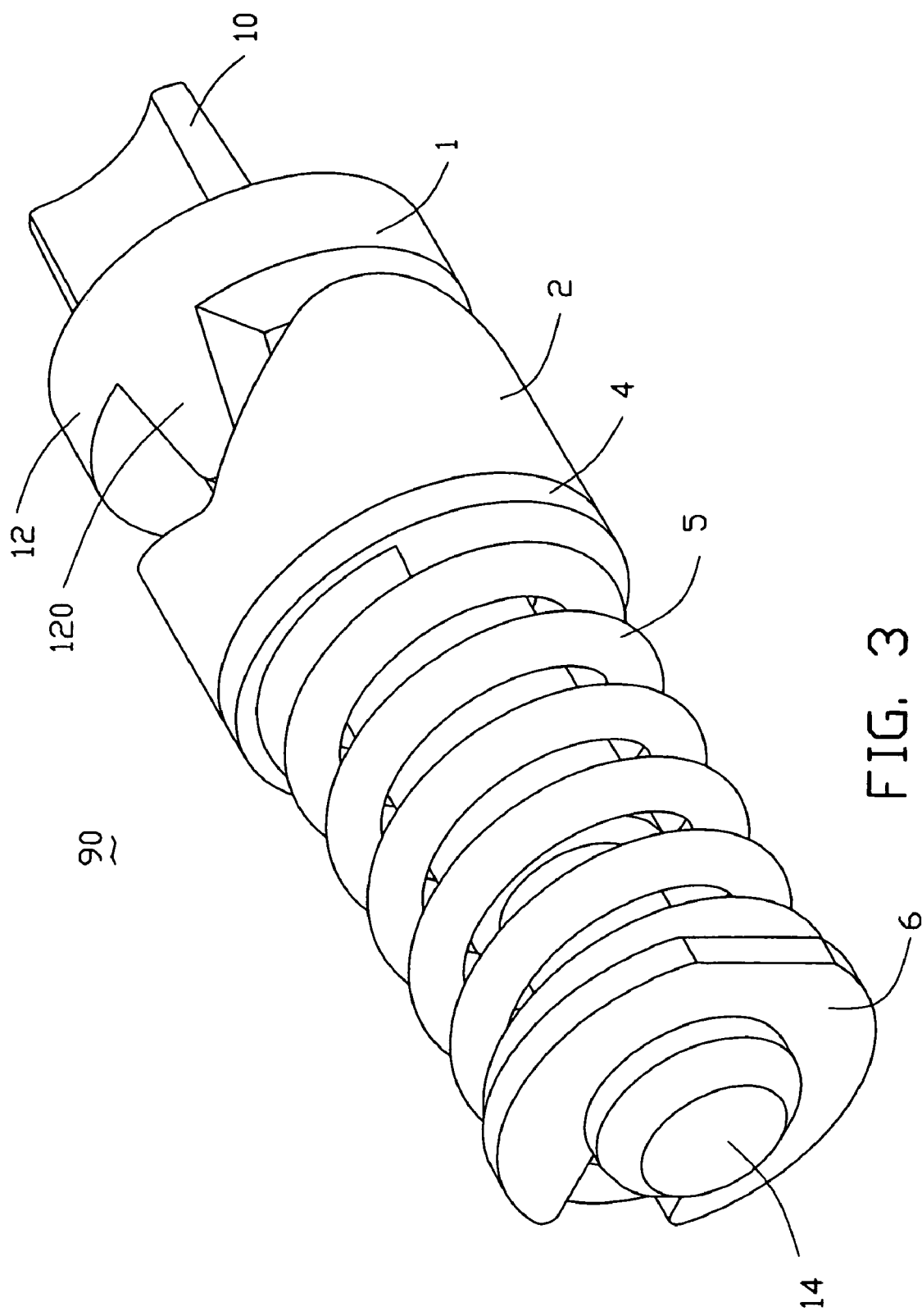
FIG. 3 is an assembled, isometric view of the hinge mechanism of FIG. 1.
Figure 4:
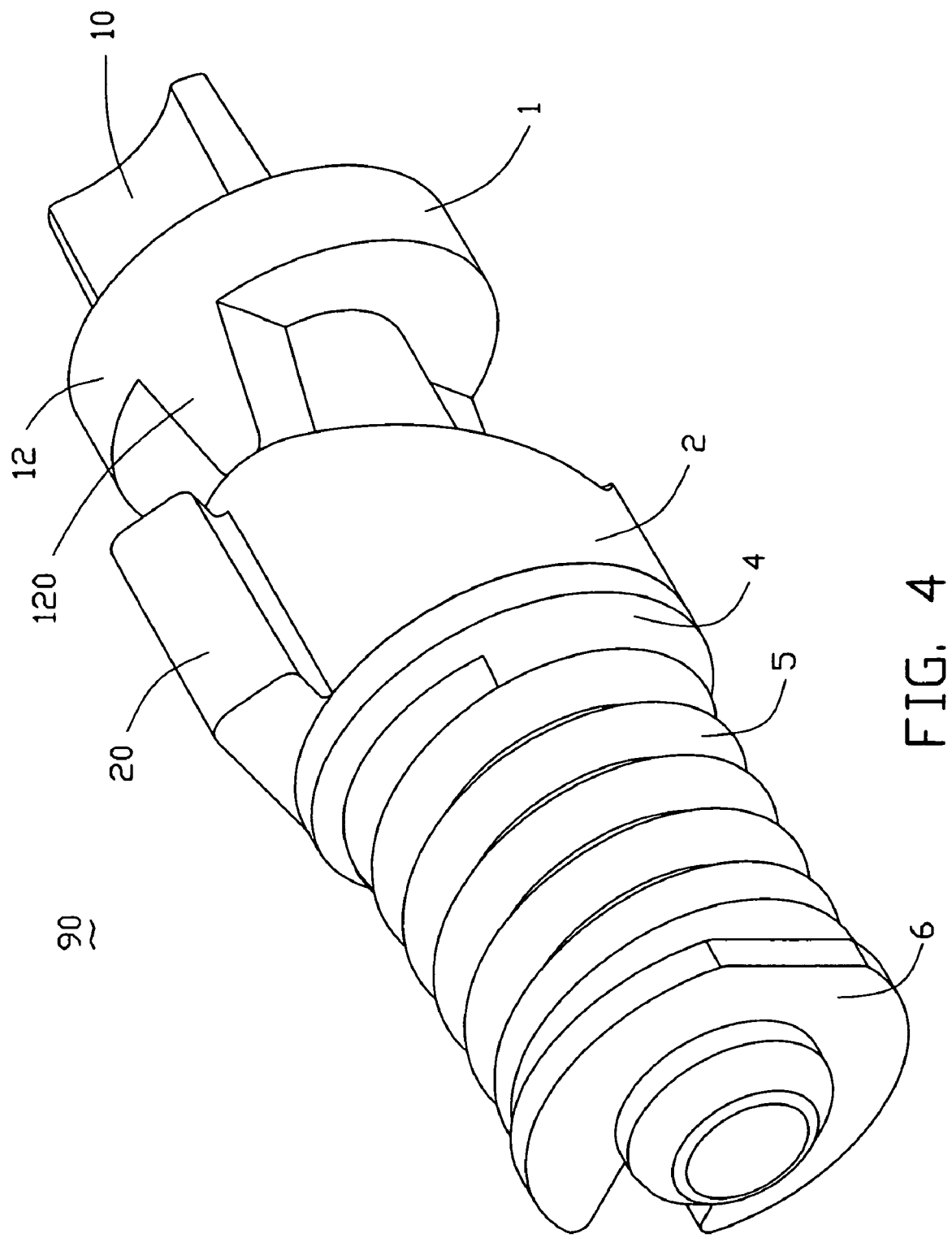
FIG. 4 is similar to FIG. 3, showing another state of the hinge mechanism.

Referring to the FIG. 3 and FIG. 4, in assembly, the antifriction member 3 is mounted in the slot 26 of the cam 2. Then the shaft portion 13 runs through the cam 2, the washer 4, the spring 5 and the ring 6, in turn. The valleys 240 of the cam 2 match with the tips 122 of the rotating portion 12 of the shaft 1. An end of the spring 5 counteracts the washer 4, and the other end of the spring 5 counteracts the ring 6. The ring 6, set adjacent to the flange 14, engages with the small shaft 130 to stop the cam 2, the washer 4 and the spring 5 from falling off the shaft 1. The cam 2 is slidable and rotatable around the shaft portion 13 relative to the shaft 1.

Figure 5:
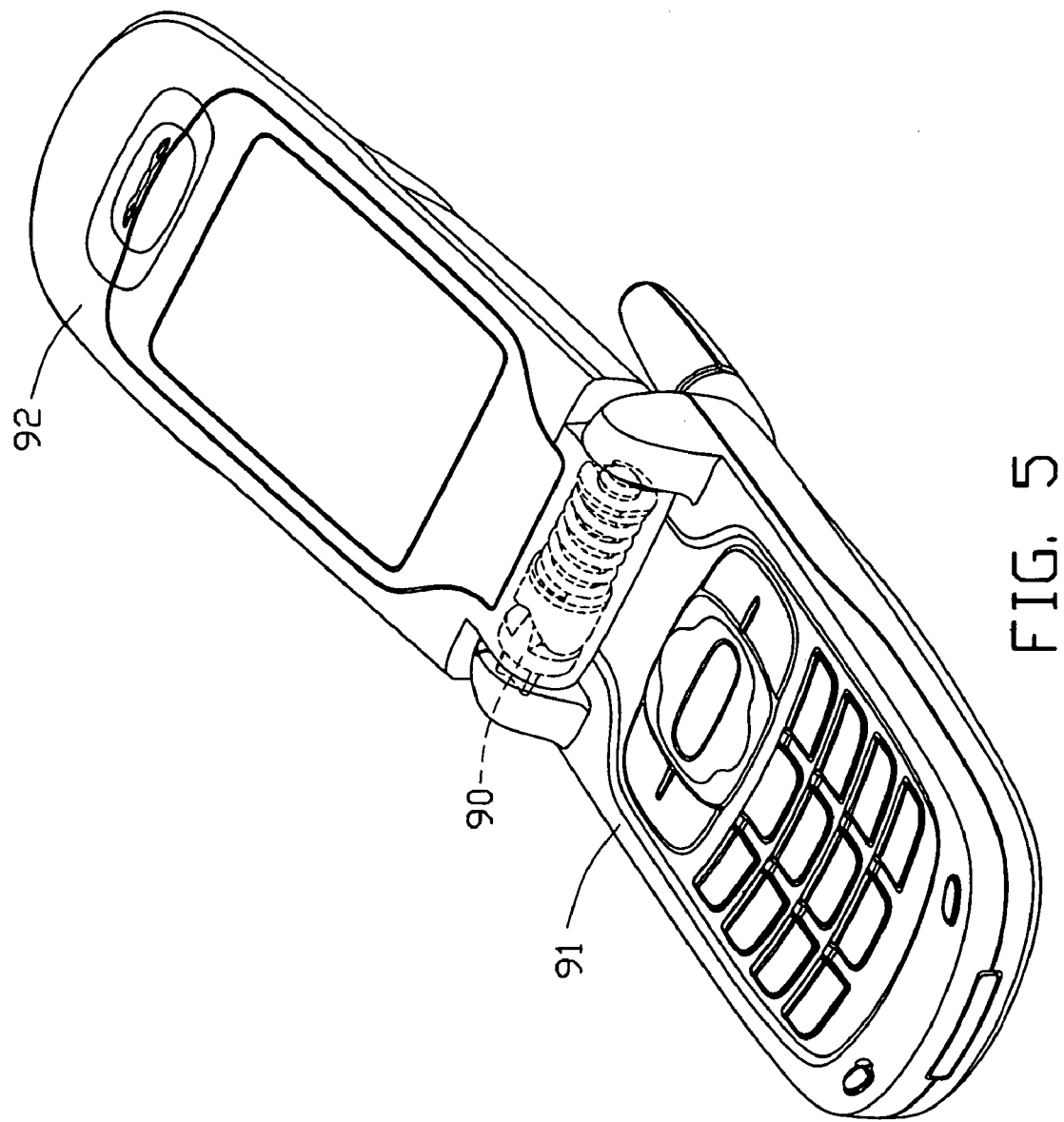
FIG. 5 is an isometric view of a foldable mobile phone, employing the hinge mechanism of FIGS. 1-4, with the hinge mechanism being shown in phantom.

Referring to FIG. 5, the hinge mechanism 90 is used in an exemplary portable electronic device having a main housing 91 and a cover 92. The cam 2 engages with the cover 92 via the rib 20 in a manner which prevents the cam 2 from rotating, thereby allowing the cam 2 to rotate together with the cover 92 relative to the main housing 91. The shaft 1 engages with the main housing 91 via the stop portion 10 in a manner which prevents the shaft 1 from rotating. When the cover 92 is closed, the tips 122 of the rotating portion 12 lie in the valleys 240 of the cam 2, and the spring 5 is in a compressed state.

When rotating the cover 92 manually to open the cover 92, the cam 2 rotates together with the cover 92 relative to the main housing 91 and the shaft 1. The tips 122 of the rotating portion 12 climb up from the valleys 240 to the peaks 242 of the cam 2. The cam 2 also slides relatively to the shaft 1. The spring 5 is further compressed as the cam 2 slides towards the spring 5. When the tips 122 reach the peaks 242 of the cam 2 shown in FIG. 4, the cam 2 and the rotating portion 12 are in an unstable state. Now, the spring 5 reaches maximum compression. When the tips 122 pass over the peaks 242, releasing the cover 92, the bounce or elastic force of the spring 5 causes the cam 2 to rotate until the tips 122 of the rotating portion 12 return into the valleys 240 of the cam 2. Namely, the cover 92 continues to rotate relative to the main housing 92 until the cam 2 stops rotating. Then the cover 92 is opened. In the embodiment, the cover 92 is opened to a prearranged angle limited by the cam surface 24 of the cam 2 and the extensions 120 of the shaft 1. Also, the cover 92 can be opened to a prearranged angle limited by a structural limitation of the main housing 91 and the cover 92. The process of closing the cover 92 is substantially the reverse of the above-described opening process and is performed in the same manner.

In the process of opening or closing the cover 92, the antifriction member 3 rotates together with the cam 2 and the antifriction member 3 abuts against the washer 4. Thus an axial load is generated. A formula for computing friction is $F_f = \mu * N$. ($F_f$ stands for friction, $\mu$ stands for friction coefficient, N stands for pressure). For the present hinge mechanism system, the friction ($F_f$) is effectively reduced as the friction coefficient ($\mu$) between the antifriction member 3 and the washer 4 is smaller than that of the cam 2 and the washer 4 in a situation that the pressure N is the same as other hinge mechanisms without any antifriction member. The waste of energy is accordingly reduced.

Figure 6:
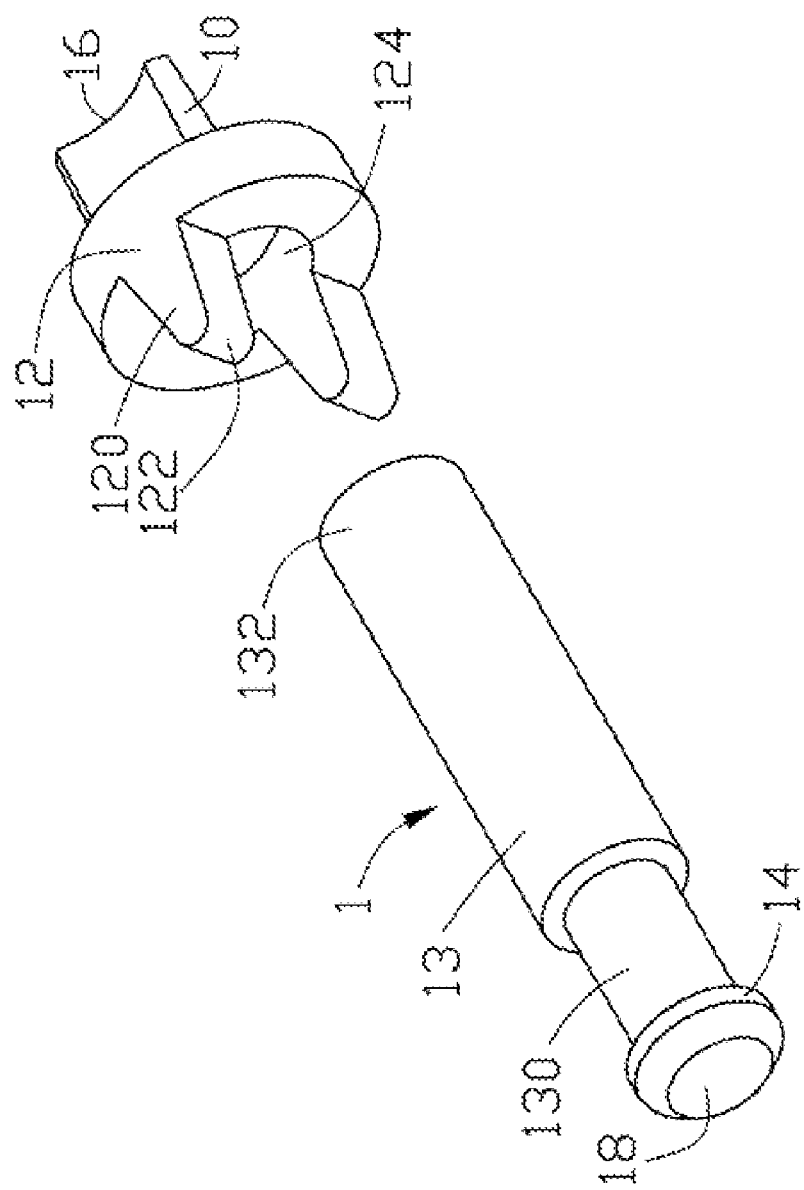
FIG. 6 is an exploded, isometric view of a shaft shown in FIG. 1 accordance with an alternative embodiment of the hinge mechanism.

Referring to FIG 6. in alternative embodiment, the rotating portion 12 and the shaft 1 can be manufactured separately and then connected together by another structure. For example, the rotating portion 12 can have a hole 124 along an axis thereof, and the shaft 1 can have a protrusion 132 at a sidewall thereof. In this instance the protrusion 132 can engage with the hole 124 to connect the rotating portion 12 and the shaft 1 together. Namely, the rotating portion 12 can be a separate cam follower. In addition, the flange 14 can be replaced by a screw thread and nut structure. Furthermore, the flange 14 and the ring 6 can be omitted, and a structure (such as an installation hole) defined in the main housing 91 and the cover 92 will prevent the cam 2, the washer 4 and the spring 5 from falling off the shaft 1. Moreover, the stop portion 10 can be formed on the rotating portion 12. Furthermore, the spring 5 can be replaced by other elastic member such as a rubber bar. Moreover, the antifriction member 3 can be solid matter as described above. The antifriction member 3 also can be liquid lubricant or grease lubricant in the slot 26 of the cam 2. In that case, the lubricant will form a film which will also reduce the friction ($F_f$).

It is believed that the embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

We claim:

1. A hinge mechanism comprising:
    a shaft;
    a cam follower fixed relative to the shaft, the cam follower having a cam follower surface;
    a cam having a cam surface facing the cam follower surface and a cam hole defined therein, the cam being rotatable relative to the cam follower, the cam defining a slot at an opposite end to the cam surface;
    an antifriction member being ring-shaped and having two ends, the antifriction member being mounted in the slot of the cam;
    an elastic member; and
    a washer;
    wherein the shaft runs through the cam, the washer and the elastic member, in turn, the antifriction member has one end touching the cam and an opposite end touching the washer, the cam surface abuts against the cam follower surface due to the elastic force of the elastic member.

2. The hinge mechanism as claimed in claim 1, wherein the antifriction member is made of materials with low friction coefficient so that a friction coefficient between the antifriction member and the washer is lower than that between the cam and the washer, the antifriction member rotates together with the cam.

3. The hinge mechanism as claimed in claim 2, wherein the antifriction member is made of one of nylon and polyformaldehyde.

4. The hinge mechanism as claimed in claim 1, wherein one end of the shaft or the cam follower forms a stop portion, and the cam has a rib formed thereon.

5. The hinge mechanism as claimed in claim 1, wherein the shaft and the cam follower are integrally formed.

6. The hinge mechanism as claimed in claim 1, wherein the shaft and the cam follower are formed separately.

7. The hinge mechanism as claimed in claim 1, wherein a flange is formed at the other end of the shaft, and the hinge mechanism further comprises a ring arranged on the shaft adjacent to the flange.

8. The hinge mechanism as claimed in claim 1, wherein the washer has a size appropriate for receiving in the slot of the cam, the thickness of the antifriction member is either larger, smaller than or equal to the depth of the slot of the cam.

9. The hinge mechanism as claimed in claim 1, wherein the washer has a size such that it can not be received in the slot of the cam, the thickness of the antifriction member is either larger than or equal to the depth of the slot of the cam, the antifriction member touches the washer.

10. An electronic device comprising:
    a main housing;
    a flip cover; and
    a hinge mechanism for rotatably hinging the main housing and the cover, the hinge mechanism comprising:
    a shaft with a stop portion;
    a cam follower having an extension connected to the shaft;
    a cam having a cam surface and a cam hole defined therein, the cam defining a slot at an opposite end to the cam surface;
    an antifriction member being ring-shaped and having two ends, the antifriction member being mounted in the slot of the cam;
    an elastic member; and
    a washer, the shaft running through the cam, the washer and the elastic member, in turn, the cam surface of the cam facing the extension of the cam follower, the antifriction member has one end touching the cam and an opposite end touching the washer, the cam abuts against the extension of the cam follower due to the elastic force of the elastic member;
    wherein the stop portion of the shaft unrotatably engages with one of the main housing and the cover, the cam unrotatably engages with the other of the main housing and the cover.

11. The electronic device as claimed in claim 10, wherein the shaft and the cam follower are integrally formed.

12. The electronic device as claimed in claim 10, wherein the shaft and the cam follower are formed separately.

13. The electronic device as claimed in claim 10, wherein a flange is formed at one end of the shaft, and the hinge mechanism further comprises a ring arranged on the shaft adjacent to the flange.

14. A hinge assembly comprising:
    a hinge shaft;
    a rotating member, the hinge shaft running through the rotating member, the rotating member being rotabably attached around the shaft in such a manner that rotation of the rotating member causes a relative axial movement between the rotating member and the hinge shaft;
    an elastic member resiliently and axially resisting the rotating member;
    an antifriction member arranged between the rotating member and the elastic member, the rotating member forming a slot at one side facing the elastic member, and the antifriction member being mounted in the slot, the antifriction member being in plate form and made of a material having low friction coefficient so as to reduce friction produced by rotation of the rotating member relative to the elastic member.

15. The hinge assembly of claim 14, wherein the antifriction member is carried by and thus rotatable along with the rotating member.

16. The hinge assembly of claim 14, further comprising a washer engaged between the elastic member and the antifriction, member.

* * * * *